United States Patent
Choi et al.

(10) Patent No.: US 9,600,541 B2
(45) Date of Patent: Mar. 21, 2017

(54) METHOD OF PROCESSING AND ANALYSING VEHICLE DRIVING BIG DATA AND SYSTEM THEREOF

(71) Applicant: KOOKMIN UNIVERSITY INDUSTRY-ACADEMIC COOPERATION FOUNDATION, Seoul (KR)

(72) Inventors: Eun Mi Choi, Seoul (KR); Won Hee Cho, Seoul (KR)

(73) Assignee: KOOKMIN UNIVERSITY INDUSTRY ACADEMY CORPORATION FOUNDATION, Seoul (KR)

(*) Notice: Subject to any disclaimer, the term of this patent is extended or adjusted under 35 U.S.C. 154(b) by 31 days.

(21) Appl. No.: 14/616,633

(22) Filed: Feb. 6, 2015

(65) Prior Publication Data

US 2015/0317844 A1    Nov. 5, 2015

(30) Foreign Application Priority Data

May 2, 2014 (KR) .................. 10-2014-0053388
May 2, 2014 (KR) .................. 10-2014-0053389

(51) Int. Cl.

| | | |
|---|---|---|
| G01M 17/00 | (2006.01) |
| G06F 7/00 | (2006.01) |
| G06F 11/30 | (2006.01) |
| G06F 19/00 | (2011.01) |
| G07C 5/00 | (2006.01) |
| G06F 17/30 | (2006.01) |
| G06Q 40/08 | (2012.01) |

(52) U.S. Cl.
CPC ....... *G06F 17/30539* (2013.01); *G06Q 40/08* (2013.01); *G07C 5/008* (2013.01)

(58) Field of Classification Search
CPC ........................................ G07C 5/008
USPC ........................................ 709/29.3
See application file for complete search history.

(56) References Cited

U.S. PATENT DOCUMENTS

2004/0243368 A1* 12/2004 Hiemer .............. B60W 40/02
                                                                    703/8

FOREIGN PATENT DOCUMENTS

| KR | 10-2008-0005792 | 1/2008 |
| KR | 10-2009-0054417 | 5/2009 |
| KR | 10-2010-0065727 | 6/2010 |
| KR | 10-2012-0059716 | 6/2012 |
| KR | 10-2013-0142243 | 12/2013 |

OTHER PUBLICATIONS

Notice to Submit Response received in KR Application No. 10-2014-0053389 mailed Jul. 16, 2015 (with English translation thereof).
Notice to Submit Response received in KR Application No. 10-2014-0053388 mailed Apr. 29, 2015 (with English translation thereof).

* cited by examiner

*Primary Examiner* — Maceeh Anwari
(74) *Attorney, Agent, or Firm* — Sughrue Mion, PLLC

(57) ABSTRACT

Provided is a method of processing and analyzing vehicle driving big data, the method including: refining vehicle driving data of raw data; acquiring statistical data based on the refined vehicle driving data; and performing mining analysis based on at least one of the refined vehicle driving data and the acquired statistical data.

18 Claims, 17 Drawing Sheets

FIG. 20

| Item | | Byte | Notation Method | Part |
|---|---|---|---|---|
| Model Name | | 20 | Arranged on the right and Space # display | Header |
| VIN Number | | 17 | English (Upper) Display Numeric Number | |
| Vehicle Type | | 2 | 31: General freight car, 32: Individual freight cars | |
| Vehicle Registration Number | | 12 | All Vehicle registration number | |
| Transportation Company Registration Number | | 10 | All Transportation Company Registration Number | |
| Driver Code | | 18 | Driver's license Number, Space # display | |
| Travel distance | Daily | 4 | 0 hour–24 hour driving distance (range: 0000–9999) | Body |
| | accumulation | 7 | Accumulated distance from registration date (range : 0000000~9999999) | |
| Date/Time of information occurrence | | 14 | YYMMDDhhmmssss (Year/Month/Day/Hour/Min/0.01Sec) | |
| Speed (km/h) | | 3 | Range: 000–255 | |
| RPM | | 4 | Range: 0000–9999 | |
| Break Signal | | 1 | Range: 0(off) or 1(on) | |
| GPS coordinates of Car | x | 9 | Decimal Display (ex: 127.123456*1000000 →127123456) | |
| | y | 9 | | |
| GPS Angle | | 3 | Range: 0–360 (1° = 1 display, in 0–360°) | |
| Acceleration | ΔVx | 6 | Range: -100.0→100.0 | |
| | ΔVy | 6 | | |
| Status Code of the Device | | 2 | 00: DTG normal status 11: GPS abnormal status 12: Speed Sensor abnormal 13: RPM sensor abnormal etc | |

METHOD OF PROCESSING AND ANALYSING VEHICLE DRIVING BIG DATA AND SYSTEM THEREOF

CROSS-REFERENCE TO RELATED APPLICATION

This application claims under 35 U.S.C. §119(a) the benefit of Korean Patent Application No. 10-2014-0053388 filed on May 2, 2014 and Korean Patent Application No. 10-2014-0053389 filed on May 2, 2014, the entire contents of which are incorporated herein by reference.

BACKGROUND (a) Technical Field

The present invention relates to a method of processing and analyzing vehicle driving big data, and more particularly, to a method of processing and analyzing vehicle driving big data and a system thereof capable of acquiring useful information from big data regarding a vehicle driving through systematic data refining and data mining procedures.

(b) Background Art

Big data mean a large amount of data which are difficult to be collected, stored, and analyzed by a general database system. As an example of the big data, social media, social data generated from social network services, network traffic logs, web logs of web servers or application programs, and sensing data and logs acquired by sensing equipment logs, and the like may be included, and in the case of time-series data such as the network traffic logs, the data are accumulated with time and a size of the data to be handled is explosively increased.

As an example of the time-series data, vehicle driving data are included. The vehicle driving data are provided to a manager, for example, a transportation organization, the transportation safety authority (for example, NHTSA(National Highway Traffic Safety Administration), etc.), sales business and/or rental business operator for vehicles to be used for driving history management, establishment of cause of the accident during accident occurrence, accident prevention, energy saving management and the like.

Recently, installation and supply of vehicle driving recorders have been enlarged with respect to vehicles. Due to a characteristic of the time-series data, an amount of the vehicle driving data required for processing and analyzing is rapidly increased, and as a result, it is necessary to develop a method of processing and analyzing vehicle driving big data in order to systematically analyze a large amount of vehicle driving data and allow the manager or the user to efficiently use useful information acquired through analysis.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a method of processing and analyzing vehicle driving big data and a system thereof having advantages of systematically analyzing big data for a vehicle driving and allowing a manager or a user to efficiently use result information acquired through analysis.

In a preferred embodiment, a method of processing and analyzing vehicle driving big data, the method includes: refining vehicle driving data of raw data; acquiring statistical data based on the refined vehicle driving data; and performing mining analysis based on at least one the refined vehicle driving data and the acquired statistical data.

The vehicle driving data may include identification data and sensing data, the identification data may include at least one of records for fields of a vehicle identification number, a vehicle type, a vehicle registration number, a transportation business operator registration number (for example, name of carrier), and a driver identification code, shipping document information, name of shipper and commodity and the sensing data may include at least one of records for fields of a travel distance, a driving time, starting time, a data acquisition period, a data acquisition time, a speed, an RPM, a break signal, a position, an azimuth, and acceleration, location (for example, GNIS (The Geographic Names Information System), etc.) of the vehicle, and OBD-II Information.

The refining may include: detecting an outlier by determining whether the record for each field of the sensing data has a value within a limit range; and removing the record or correcting the record to correspond to the value in the limit range when the record detected as the outlier has a value beyond the limit range.

The refining may include: detecting the outlier by deviation-comparing the subsequent records for each field of the refined sensing data, after the correcting; and removing the record detected as the outlier through the deviation comparison.

The refining may include: detecting the outlier by comparing records of fields having a correlation in the refined sensing data, after the correcting; and removing the record detected as the outlier through the correlation comparison.

The acquired statistical data may include driving statistical data and tendency statistical data, The driving statistical data may include at least one of records for fields of a daily travel distance, a total driving time, an average speed, a maximum speed, and a maximum RPM, mileage (i.e. fuel efficiency), Fuel Consumption, energy consumption, Exhaust emissions, driving area, distance between cars and The tendency statistical data may include at least one of records for fields of the number of overspeed, the number of dangerous overspeed, the number of long-term overspeed, the number of rapid acceleration, the number of rapid deceleration, the number of quick start, the number of rapid stopping, the number of overtaking, the number of course changing, the number of rapid rotation, the number of idling, the number of high RPM, and a distance between cars.

The acquiring of the statistical data may include: generating the statistical data by statistically calculating the refined vehicle driving data; determining whether the records for each field are repetitively calculated within a predetermined time in the generated statistical data; and correcting the records determined to be repetitively calculated to one calculated value.

The performing of the mining analysis may include: classifying driving tendencies of the vehicle driver for each type based on the tendency statistical data; and indexing the tendency degree of the vehicle driver with respect to each of the classified types.

The performing of the mining analysis may include: generating index information indicating a result indexed for the classified types, after the indexing; and analyzing a correlation of at least one of the fields of the tendency statistical data and the index information.

The performing of the mining analysis may include: analyzing a repeated pattern based on a specific period, based on the refined vehicle driving data and the fields of the acquired statistical data; and analyzing a driving tendency of the vehicle driver at the specific period based on the repeated pattern.

The acquired statistical data may further include history data including records for accident history and maintenance history fields, and The performing of the mining analysis may include: generating a learning mode for predicting a change in at least one of the accident history and maintenance history fields, based on the refined vehicle driving data and the acquired statistical data; and analyzing at least one the accident risk and a maintenance time of the vehicle by using the learning model.

The performing of the mining analysis may include: generating index information indicated by indexing the degree of the accident risk or whether the maintenance time is coming based on the analysis result, after analyzing at least one of the accident risk and the maintenance time.

The performing of the mining analysis may include: extracting location information of the vehicle based on the refined vehicle driving data and the acquired statistical data; and analyzing a space increasing accident risk and increasing air pollution based on the extracted location information of the vehicle and the fields of the tendency statistical data.

The performing of the mining analysis may include: extracting location information of the vehicle based on the refined vehicle driving data and the acquired statistical data; and analyzing the driving tendencies of the drivers for each administrative district, based on the extracted location information of the vehicle, the tendency statistical data, and map data.

The performing of the mining analysis may include: generating index information indicated by indexing the tendency degree of the classified type; and analyzing a distribution state of the generated index information, based on the transportation business operator registration number field of the refined vehicle driving data.

The performing of the mining analysis may include: generating index information indicated by indexing the tendency degree of the classified type; and classifying before and after the driver of the vehicle recognizes the generated index information to detect a change of the generated index information, the refined vehicle driving data, and the acquired statistical data and analyzing a change of the driving tendency of the vehicle driver based on the detection result.

Before the refining of the vehicle driving data, the method may further include collecting vehicle driving data acquired from a vehicle driving recorder or a sensor.

The acquired statistical data include statistical data related to at least one of fuel consumption and Exhaust emissions, and The acquired statistical data is classified according to at least one of driver, transportation business operator, region, road, respectively, and The performing of the mining analysis may include: generating at least one of Eco driving information of driver and predicted overloading information of vehicle based on the statistical data related to at least one of fuel consumption and Exhaust emissions.

The acquired statistical data include statistical data related to diagnostic code of OBD-II (On Board Diagnostics II), and The acquired statistical data is classified according to at least one of driver, transportation business operator, model of vehicle, model year of vehicle, respectively, and The performing of the mining analysis may include: generating at least one of predicted information regarding abnormality of vehicle, accident risk, and vehicle maintenance based on the statistical data related to diagnostic code.

In another preferred embodiment, a system of processing and analyzing vehicle driving big data, the system includes: as the system of processing and analyzing big data by using vehicle driving data, a big data storing unit configured to store the vehicle driving data of raw data; and a big data processing unit configured to refine the vehicle driving data of the raw data stored in the big data storing unit, acquire statistical data based on the refined vehicle driving data, and perform mining analysis based on at least one of the refined vehicle driving data and the acquired statistical data.

According to the embodiment of the present invention, when the big data configured by the collected vehicle driving data are analyzed, it is possible to reduce an analysis error and improve analysis performance, by performing two-step refining with respect to raw data, extracting statistical data from the refined raw data, and performing complex data mining at a short-term viewpoint and a long-term viewpoint.

Further, by providing result information extracted by analyzing the big data configured by the collected vehicle driving data to the user, safe driving induction of the vehicle driver, vehicle fuel efficiency improvement induction, pre-maintenance induction, and accident prevention are possible, management efficiency of the transportation business operator may be improved, and an administrative district, a road, and the like causing accident risk and environmental degradation in public institutions such as the transportation safety authority may be efficiently improved.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 20 is a diagram exemplifying a storage format of a digital tachograph (DTG) or digital tachometer as an example of vehicle driving data.

Figure 1:
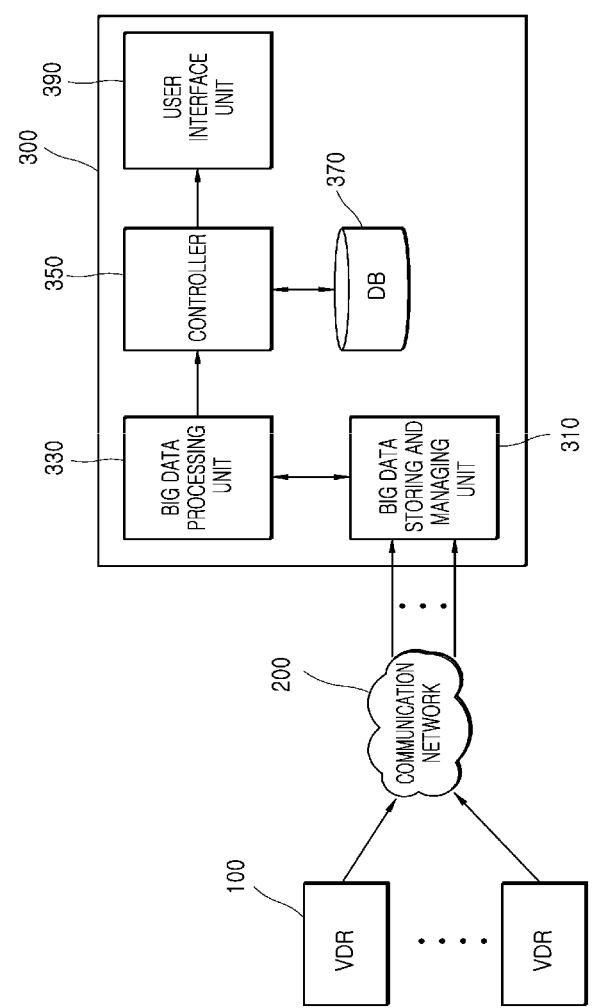
FIG. 1 is a diagram for describing a system of processing and analyzing vehicle driving big data according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, embodiments of the present invention will be described with reference to the accompanying drawings. Like reference numerals refer to like elements in the drawings and a duplicated description of like elements will be skipped.

The embodiments of the present invention are provided to more completely describe the present invention to those skilled in the art and the following embodiments may be modified to various different forms and the scope of the present invention is not limited to the following embodiments. Still, the embodiments are provided to make the disclosure be more faithful and complete and completely transfer the spirit of the present invention to those skilled in the art.

In describing the embodiments of the present invention, when it is determined that the detailed description of the known art related to the present invention may obscure the gist of the present invention, the detailed description thereof will be omitted. Further, numerical figures (for example, first, second, and the like) used during describing the specification are just identification symbols for differentiating one component from other components. Further, in the specification, when it is mentioned that one element is "connected with" or "accesses" the other element, the one element may be directly connected with or directly accesses the other element, but if there is a not particularly contrary description, it should be appreciated that both elements may be connected with or accesses each other with another element intervening therebetween.

In addition, terminologies used in the specification as terminologies used to appropriately express embodiments of the present invention may vary depending on a user, a user's intention, or a practice of a field to which the present invention belongs. Therefore, the terminologies of the present invention should be defined based on the entire contents of the present specification. Like reference numerals in respective drawings refer to like elements.

FIG. 1 is a diagram for describing a system of processing and analyzing vehicle driving big data according to an embodiment of the present invention.

In FIG. 1, a system of processing and analyzing big data configured by vehicle driving data which are directly acquired by a vehicle driving recorder (VDR) is exemplified, but the technical idea of the present invention is not limited thereto. That is, the technical idea of the present invention may also process big data regarding a vehicle driving which is acquired from various sensors installed in a transportation means such as a vehicle, in addition to the data which is directly acquired by the VDR like the embodiment of FIG. 1. Further, according to the technical spirit of the present invention, data (for example, positional information, speed information, acceleration information, and the like which may be acquired through a GPS sensor, an accelerator sensor, and the like mounted on the smart phone) regarding the operation of the vehicle, which is indirectly acquired through a user terminal (for example, the smart phone) of an occupant that rides in the vehicle may also be used in addition to the data acquired through the equipment mounted on the vehicle, such as the VDR, the sensor, the black box, and the like. The data acquired from the user terminal possessed by the occupant is collected through the short distance wireless communication network such as Bluetooth, Wi-Fi, NFC (Near Field Communication), RFID (Radio Frequency Identification), and the like to be used for processing big data regarding the operation of the vehicle. However, hereinafter, for convenience of description, a case where the big data acquired by the VDR is used as vehicle driving big data will be mainly described.

Referring to FIG. 1, a system 300 of processing and analyzing the vehicle driving big data is connected with a plurality of VDRs 100 through a communication network 200. Here, the VDR 100 is mounted on a transportation means such as a vehicle to collect and acquire vehicle driving data of the corresponding transportation means and may transmit the acquired vehicle driving data to the system 300 of processing and analyzing the vehicle driving big data through the communication network 200. However, in FIG. 1, a case where the vehicle driving data are transmitted to the system 300 of processing and analyzing the vehicle driving big data through the communication network 200 is exemplified, but of course, the present invention is not necessarily limited thereto.

The vehicle driving data acquired by the VDR 100 may have a storage format as illustrated in FIG. 20. Here, FIG. 20 illustrates a storage format of a Digital Tachograph or Digital Tachometer (DTG) as an example of vehicle driving data. However, it is natural that the vehicle driving data which are recordable according to a used VDR storage format may be variously modified. That is, in the specification of the present invention, as the VDR, a Digital Tachograph or Digital Tachometer (DTG) that records vehicle operation data illustrated in FIG. 20 is primarily described, but as the VDR, various equipments may be used in addition to the DTG. For example, as the VDR, EOBR (Electronic On-Board Recorder), EDR (Event Data Recorder), OBD-II (On Board Diagnostics II), and the like may be used. The equipments will be described below in brief.

Herein, the EOBR used for preventing an accident caused due to fatigue accumulation by a driver's excessive operation is an equipment which is obligatorily mounted on a business vehicle in the U.S. A vehicle operation data associated field recorded by the EOBR includes a driver, a transportation business operator name, a vehicle number, a vehicle position, a traveling distance, a start time, an actual operation time, a work status, a data/time, name of shipper and commodity, shipping document information and the like.

In addition, the EDR as an equipment that records information for several seconds before and after the accident time may record the vehicle operation data in link with a specific event (for example, an event in which the airbag is exploded). The vehicle operation data associated field recorded by the EDR includes a vehicle ID, a data/time, a speed in a collision, a start speed, a collision speed variation value, a driver action (for example, actions associated with brake, clutch pedal, steering, horn, and the like), monitoring information regarding an Active Safety Device (for example, an ABS, and the like), and the like.

In addition, the OBD-II may be used for vehicle diagnosis and is Bluetooth-link with the user terminal such as the smart phone to be used for echo driving. The vehicle operation data associated field recorded by the OBD-II includes Engine coolant temperature, Throttle position, Intake air temperature, Fuel Level Input, Evap. System Vapor Pressure, Control module voltage, Absolute throttle position, Accelerator pedal position, Oxygen sensor voltage, Fuel Type, Engine oil temperature, Fuel injection timing, Engine fuel rate, Engine reference torque, Engine percent torque data, NOx sensor, diagnostic code and the like.

The system 300 of processing and analyzing the vehicle driving big data using the vehicle driving data as described above may include a vehicle driving big data storing and managing unit 310 (hereinafter, referred to as a storing and managing unit), a vehicle driving big data processing unit 330 (hereinafter, referred to as a processing unit), a controller 350, a database 370, and a user interface 390, and hereinafter, each constituent unit will be sequentially described with reference to FIGS. 2 to 13.

Figure 2:
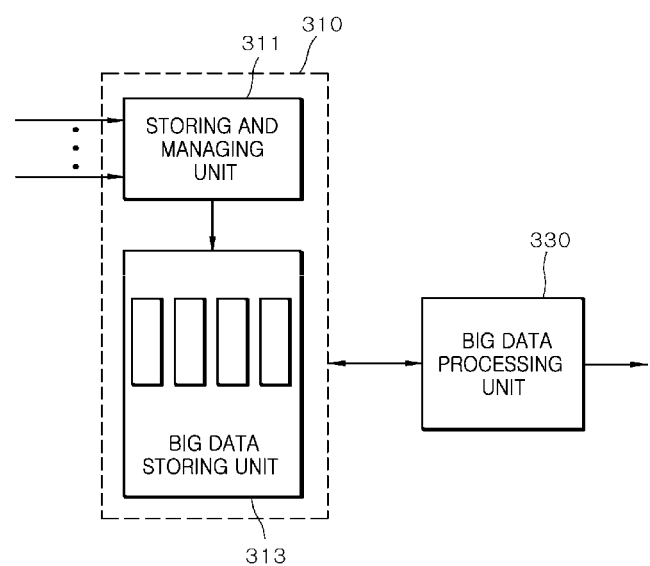
FIG. 2 is a diagram for more particularly describing a storing and managing unit in the system of processing and analyzing the vehicle driving big data according to the embodiment of the present invention.

[Function and Role of Vehicle Driving Big Data Storing and Managing Unit—FIG. 2]

FIG. 2 is a diagram for more particularly describing the storing and managing unit 310 in the system 300 of processing and analyzing the vehicle driving big data.

Referring to FIG. 2, the storing and managing unit 310 may include a managing unit 311 and a data storing means 313.

The managing unit 311 may receive vehicle driving data of raw data provided from the plurality of VDRs 100 (see FIG. 1) through the communication unit 200 (see FIG. 1). The managing unit 311 may control vehicle driving data storage of the raw data to the data storing means 313 and vehicle driving data output of the raw data from the data storing means 313.

The data storing means 313 may store the vehicle driving data of the raw data. The data storing means 313 may be configured by, for example, many storages which are physically separated from each other, and respective storages may inter-share and store the same vehicle driving data of the raw data.

That is, the storing and managing unit 310 may be configured by a distributed file system such as a hadoop distributed file system including the managing unit 310 and the data storing means 313.

[Function and Role of Vehicle Driving Big Data Processing Unit—FIGS. 3 to 11]

Figure 3:
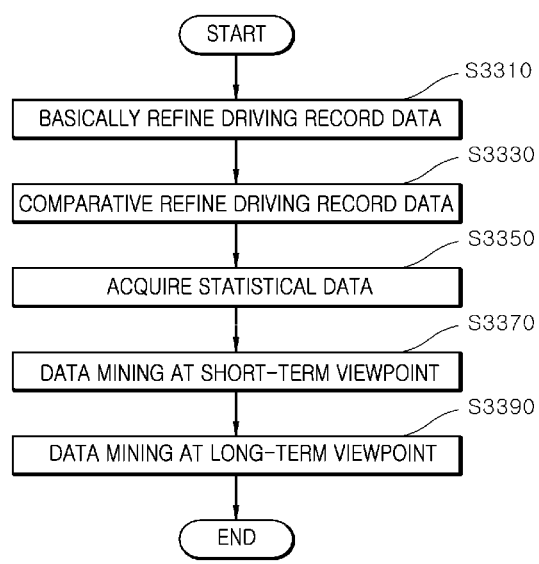
FIG. 3 is a flowchart for describing a method of processing and analyzing big data which is performed in a processing unit in the system of processing and analyzing the vehicle driving big data according to the embodiment of the present invention.

FIG. 3 is a flowchart for describing a method of processing and analyzing big data which is performed in the processing unit 330 in the system 300 of processing and analyzing the vehicle driving big data according to the embodiment of the present invention, and FIGS. 4 to 11 are diagrams for more particularly describing respective steps of the method of processing and analyzing the big data of FIG. 3. The respective steps of the method of processing and analyzing the big data illustrated in FIG. 3 may be performed in the processing unit 330 through at least one software implementing a corresponding algorithm. Hereinafter, the respective steps of the method of processing and analyzing the big data illustrated in FIG. 3 will be described with reference to FIGS. 4 to 11.

Basic Refining Process (S3310)

Figure 4:
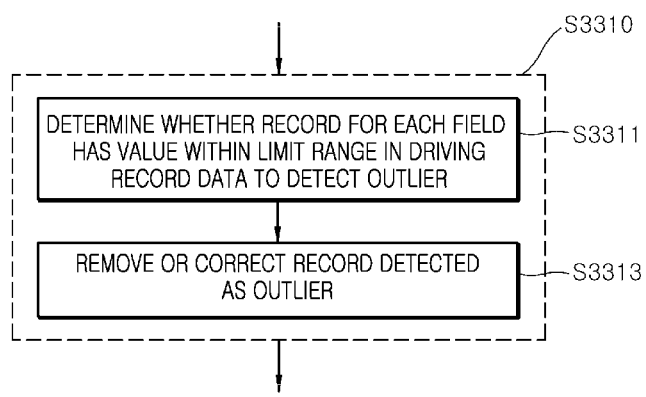
FIGS. 4 to 11 are diagrams for more particularly describing respective steps of the method of processing and analyzing the big data of FIG. 3.

Referring to FIGS. 3 and 4, the processing unit 330 may basically refine the vehicle driving data provided from the storing and managing unit 310 (S3310). Here, the vehicle driving data provided from the storing and managing unit 310 may be non-refined raw data having a storage format as illustrated in FIG. 20, and may include identification data and sensing data.

Here, the identification data may include a record for a field such as a vehicle identification number, a vehicle type, a vehicle registration number, a transportation business operator registration number (for example, name of carrier), and a driver identification code, shipping document information, name of shipper and commodity, etc., as data for identifying a vehicle mounted with the VDR 100 (see FIG. 1), a driver of the corresponding vehicle, a transportation business operator to which the corresponding mounted vehicle belongs, and the like. Further, the sensing data may include, for example, a record for a field such as a travel distance, a driving time, starting time, a data acquisition period, a data acquisition time, a speed, an RPM, a break signal, a position, an azimuth, and acceleration, location(for example, GNIS(The Geographic Names Information System), etc.) of the vehicle, and above mentioned OBD-II Information, and the like, as data acquired by various sensors to be collected by the VDR 100.

When describing the basic refining process (S3310) in detail, first, the processing unit 330 determines whether the record for each field has a value in a normal sensing range (that is, a predetermined limit range) in the vehicle driving data of the raw data (more particularly, meaning the sensing data included in the vehicle driving data) to detect an outlier (S3311).

As one example, in the case of a vehicle speed field, the processing unit 330 determines whether each record has a value in the sensing range (for example, 0 to 250 km/h) when the vehicle speed sensor normally operates to detect the record having a value beyond the sensing range as the outlier.

As another example, in the case of an RPM field, the processing unit 330 determines whether each record has a value in a sensing range (for example, 0 to 6,000 rpm) of an RPM sensor to detect the record having a value beyond the sensing range as the outlier.

As yet another example, in the case of a GPS location field, the processing unit 330 determines whether each record has a value in x and y coordinates (for example, in case the territory of the Republic of Korea, 125.8<x<131.0 and 33.0<y<39.0) corresponding to a longitude and a latitude within specific region to detect a record having a value beyond the range as the outlier.

Meanwhile, in the case of a break signal field where a sensing value of a break signal sensor is 0 and 1, 0 and 1 may be set as a reference value for detecting the outlier, and the processing unit 330 may detect a record having a value beyond the reference value among records of the break signal field as the outlier.

As described above, the processing unit 330 may remove or correct the record detected as the outlier for each field (S3313). Among the aforementioned examples, as an example of the vehicle speed field, the processing unit 330 may remove records having an upper or lower limit of the limit range and a deviation larger than a reference deviation (e.g., a sensing error range of the speed sensing device) among the records detected as the outlier in the vehicle speed field. Alternatively, the record having a deviation within the reference deviation may be corrected as a value corresponding to the upper or lower limit of the limit range.

Comparative Refining Process (S3330)

Figure 5:
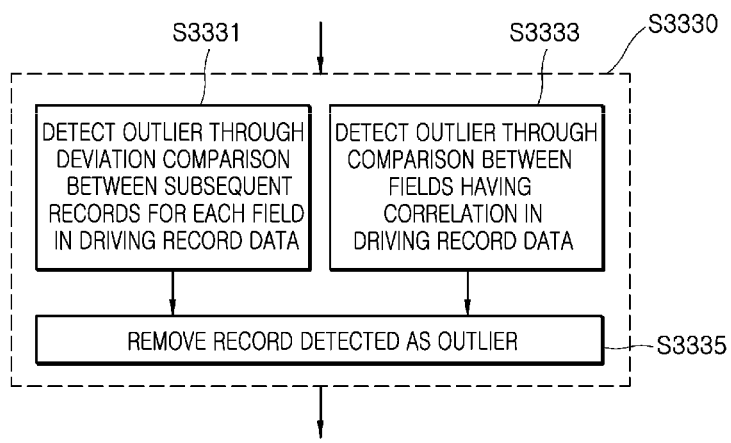

Referring to FIGS. 3 and 5, the basically refined vehicle driving data may be comparatively refined again (S3330).

In one embodiment, the processing unit 330 may detect the outlier through a deviation comparison between sequent records for each field in the basically refined vehicle driving data (S3331).

For example, when the sequent records in the vehicle speed field have significant differences (a previous record is 0 km/h and the next record is 100 km/h), the previous record and/or the next record may be detected as the outlier. Similarly, even in the case of an acceleration field, an RPM field, an azimuth field, and the like, the outlier may be detected through the deviation comparison of the sequent records.

In another embodiment, the processing unit 330 compares records of the fields having a correlation in the basically refined vehicle driving data to detect the outlier (S3333).

Figure 6:
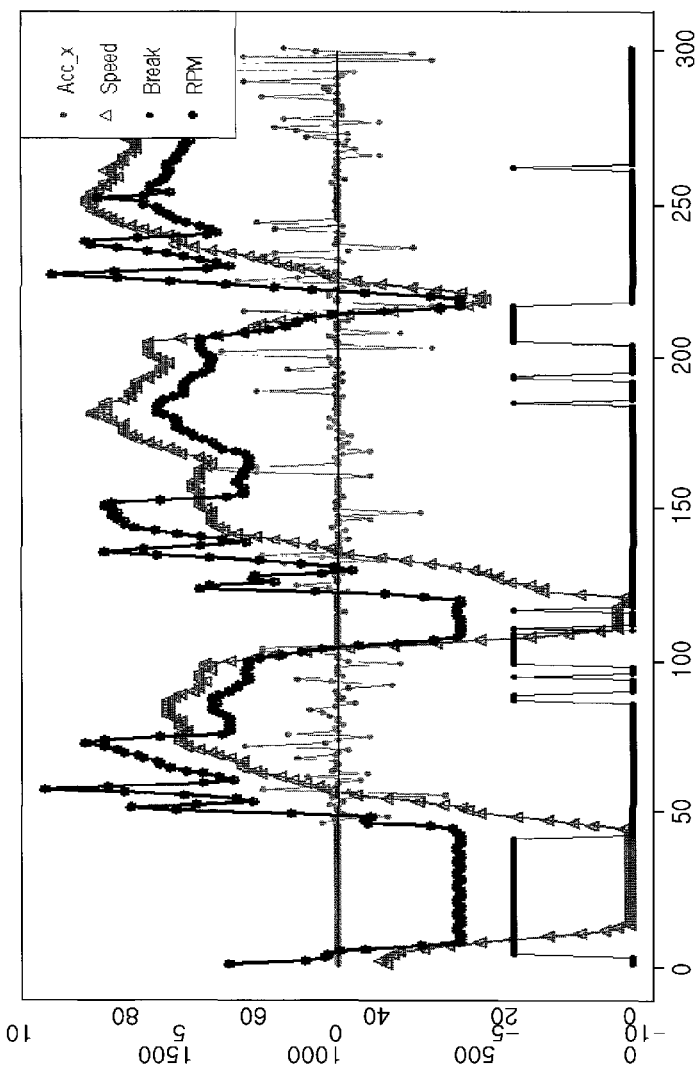
Figure 7:
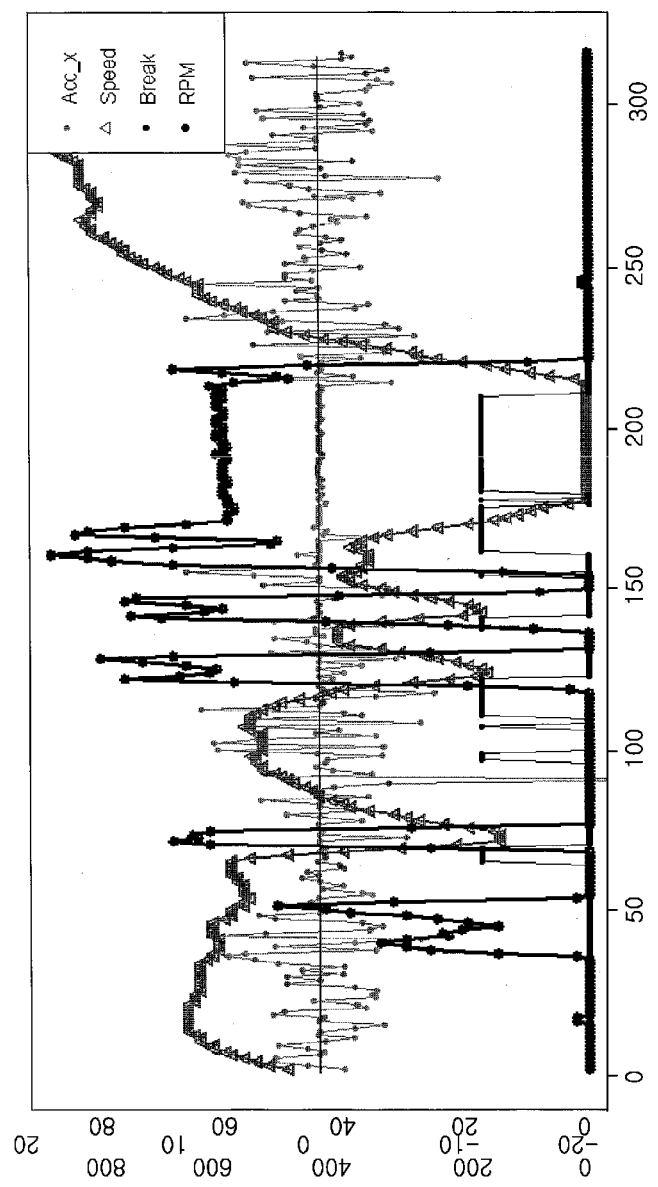

For example, referring to FIGS. 6 and 7, in the case of the vehicle speed field and the RPM field, as illustrated in FIG. 6, forming a mutually proportional relation (a Pearson correlation coefficient is 0.89826) is normal, and as illustrated in FIG. 7, since a mutually inverse relation is abnormally formed (the Pearson correlation coefficient is −0.79212), the processing unit 330 may detect records forming an abnormal relationship as the outlier by comparing the records of the fields having the correlation.

As a result, the processing unit 330 may remove the records detected as the outlier through the deviation comparison (S3331) and/or the correlation comparison (S3333) (53335).

As such, reliability of data analysis of the system 300 of processing and analyzing the vehicle driving big data through the two-step vehicle driving big refining may be improved.

Statistical Data Extracting Process (S3350)

Figure 8:
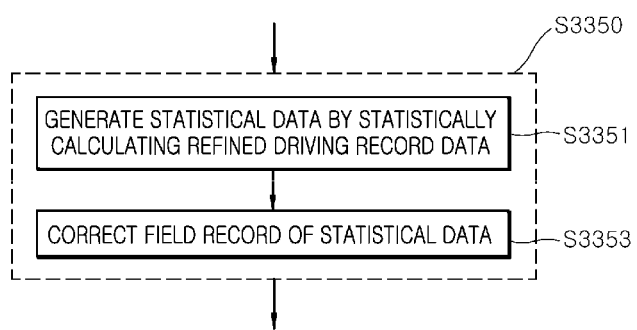

Referring to FIGS. 3 and 8, statistical data may be acquired based on the basically refined and comparatively refined vehicle driving data (S3350).

Here, the statistical data statically processes and extracts the refined vehicle driving data and may have storage formats like the following Table 1.

TABLE 1

| Item | Data type |
|---|---|
| Vehicle number | String |
| Date | Integer |
| Daily travel distance | Integer |
| Total travel distance | Integer |
| Average speed | Integer |
| Maximum speed | Integer |
| Maximum RPM | Integer |
| The number of overspeed | Integer |
| The number of dangerous overspeed | Integer |
| The number of long-term overspeed | Integer |
| The number of Rapid Acceleration | Integer |
| The number of Rapid deceleration | Integer |
| The number of quick start | Integer |

TABLE 1-continued

| Item | Data type |
|---|---|
| The number of Rapid stopping | Integer |
| The number of overtaking | Integer |
| The number of Course changing | Integer |
| The number of Rapid rotation | Integer |
| The number of High RPM | Integer |
| The number of Idling | Integer |
| Daily total driving time | Float |
| Consecutively driving time | Float |
| The number of 100 km scale overspeed | Float |
| The number of 100 km scale dangerous overspeed | Float |
| The number of 100 km scale long-term overspeed | Float |
| The number of 100 km scale rapid acceleration | Float |
| The number of 100 km scale rapid deceleration | Float |
| The number of 100 km scale quick starting | Float |
| The number of 100 km scale rapid stopping | Float |
| The number of 100 km scale overtaking | Float |
| The number of 100 km scale course changing | Float |
| The number of 100 km scale rapid rotation | Float |

Here, among the fields of the statistical data, fields related with the driving of the vehicle mounted with the VDR 100, for example, a daily travel distance, a total driving time, an average speed, and a maximum speed, and records for the fields may be classified as the driving statistical data.

Further, fields related with a driving tendency of a driver of the vehicle mounted with the VDR 100, for example, the number of overspeed, the number of dangerous overspeed, the number of long-term overspeed, the number of rapid acceleration, the number of rapid deceleration, the number of scaled overspeed, the number of scaled dangerous overspeed, and records for the fields may be classified as the driving statistical data.

Referring to FIG. 8, when describing the statistical data acquiring process (S3350) in more detail, first, the processing unit 330 may statistically calculate the refined vehicle driving data to generate the statistical data (S3351).

For example, the processing unit 330 may statistically calculate the records of the vehicle speed field in the refined vehicle driving data (for example, calculate an average value) to generate a statistical data field such as an average speed.

As another example, the processing unit 330 may statistically calculate the records of the vehicle speed field (for example, sets a speed limit of the road determined based on GPS location information as a limit value to calculate an excess number of the limit value in all periods or some periods) to generate statistical data fields of the number of overspeed, the number of dangerous overspeed, the number of long-term overspeed, and the like. Similarly, the processing unit 330 may statistically calculate the records of the acceleration field (for example, calculate an excess number of the limit value in all periods or some periods based on any value) to generate statistical data fields of the number of rapid acceleration, the number of rapid deceleration, and the like.

As yet another example, the processing unit 330 may statistically calculate the records of the travel distance and the driving time of the vehicle (for example, calculate a cumulative value and a cumulative value in some periods) to generate statistical data fields of a daily travel distance, a daily driving time of the vehicle, and the like.

As yet another example, the processing unit 330 may complexly and statically calculate records of the fields of the vehicle speed, the azimuth, the RPM, and the like (for example, calculate changes of the records of the azimuth field or the records of the RPM field based on the records of the vehicle speed field to generate statistical data fields of the number of overtaking, the number of course changing, the number of rapid rotation, and the like.

Subsequently, the processing unit 330 determines whether the field records are repetitively calculated within a predetermined time in the plurality of generated statistical data to correct the records determined to be repetitively calculated (S3353).

Figure 9:
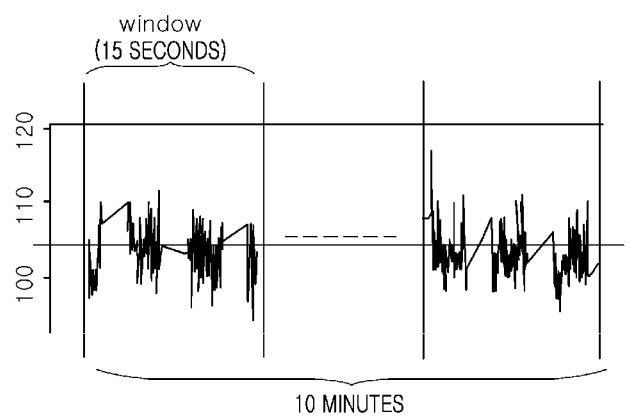

Further, referring to FIG. 9, when describing an example of generating the records of the overspeed field among the aforementioned examples, the processing unit 330 may calculate the number of overspeed as a maximum of 15 times within a predetermined time range (hereinafter, a window), for example, 15 seconds when a data acquisition period is one second. In this case, when the driver is consecutively overspeed, substantially, the records of the number of overspeed field need to be generated as 1, but may be generated as 15, thereby deteriorating the data analysis reliability.

Accordingly, the processing unit 330 determines whether the records of the number of overspeed field are repetitively calculated within the window as described above to detect the outlier and may correct the records of the number of overspeed field as 1.

As such, the data analysis reliability of the system 300 of processing and analyzing the vehicle driving big data may be further improved through the correction of the statistical data.

Data Mining Process at Short-Tem Viewpoint (S3370)

Figure 10:
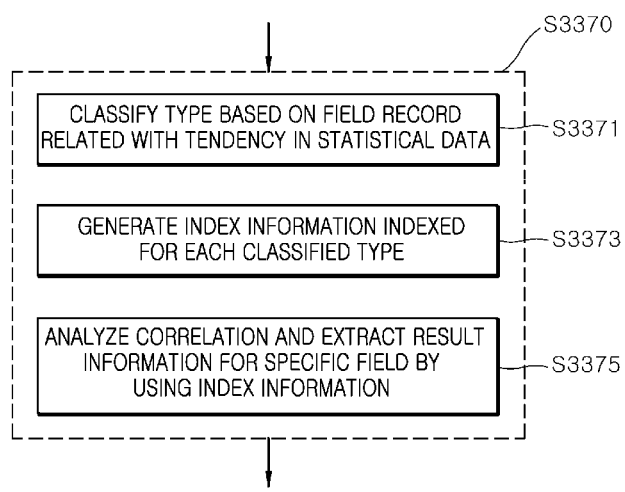

Referring to FIGS. 3 and 10, the processing unit 330 may perform a data mining analysis at a short-term viewpoint based on at least one of the refined vehicle driving data and the acquired statistical data to generate specific result information (S3370).

Herein, the data mining analysis at the short term may include cases of a data analysis at a microscopic viewpoint for an individual VDR 100 as well as a time sequential analysis at the short-term viewpoint, that is, a real-time data analysis concept. As a technique for the data mining at the short-term viewpoint, for example, in the case where direct information regarding accident/maintenance prediction such as accident history and maintenance history fields exists, a regression analysis technique, a decision tree technique, a neutral network technique, SVM(Support Vector Machine) and the like which are supervised learning type analysis techniques may be used. For example, in the case where there is no direct information such as a driver's driving type, a cluster analysis technique, an association analysis technique, and the like which are unsupervised learning type analysis techniques may be used.

Referring to FIG. 10, when describing the data mining process at the short-term viewpoint (S3370) in more detail, the processing unit 330 may classify driver's driving tendencies for each type based on a field related with the tendency, that is, tendency statistical data in the acquired statistical data (S3371).

In one embodiment, the processing unit 330 may classify driving types of the corresponding driver into a dangerous driver type, an impatient driver type, an energy-consumption driver type, and the like based on the tendency statistical data including the fields for the number of overspeed, the number of dangerous overspeed, the number of long-term overspeed, the number of rapid acceleration, the number of rapid deceleration, the number of quick start, the number of overtaking, the number of path changing, the number of idling, and the like. In this case, as the data mining technique, the unsupervised learning type analysis techniques exemplified above may be used.

In another embodiment, the processing unit 330 may generate index information represented by indexing features corresponding to the classified types (S3373).

For example, the processing unit 330 may generate index information represented by indexing the degree of the risk based of the records of the fields for the number of overspeed, the number of dangerous overspeed, the number of long-term overspeed, and the like with respect to the dangerous driver type.

As another example, the processing unit 330 may estimate fuel consumption and carbon dioxide emissions based on the records of the fields for the RPM, the number of rapid acceleration, the number of idling, and the like with respect to the energy-consumption driver type and generate fuel consumption index information and environment index information by indexing the estimated results.

The dangerous driving index information, the fuel consumption index information, and the environment index information are provided to the driver through the controller 350 (see FIG. 1) and the user interface 370 (see FIG. 1) to allow the driver to improve driving habits. Further, the dangerous driving index information is provided to a transportation business operator and the like to which the driver belongs through the controller 350 (see FIG. 1) and the user interface 370 (see FIG. 1) to allow the transportation business operator to manage, supervise, and educate the driver.

Meanwhile, the processing unit 330 may estimate the accident risk and the failure risk based on the fields for the accident history and the maintenance history included in the vehicle driving data regardless of the classified types, and may also generate accident risk index information and maintenance object index information by indexing the results of the accident risk and the failure risk.

The accident risk index information and the failure risk index information are provided to the driver and the transportation business operator like the dangerous driving index information to prevent accidents of the driver and the transportation business operator and maintain the vehicle at an appropriate time.

Further, in one embodiment, the processing unit 330 may perform mining for analyzing a correlation between specific index information and a specific field of the tendency statistical data or between the specific index information and a specific field of the refined vehicle driving data, and extract result information indicating an interaction analysis result therebetween (S3375).

For example, the processing unit 330 may analyze the interaction by analyzing the correlation between the dangerous driving index information and the field for a vehicle type or a vehicle model and extract result information indicating the interaction analysis result therebetween.

More specifically, above mentioned acquired statistical data include statistical data related to at least one of fuel consumption and Exhaust emissions. Here, the acquired statistical data is classified according to at least one of driver, transportation business operator, region, road, respectively. Therefore, the performing of the mining analysis may include generating at least one of Eco driving information of driver and predicted overloading information of vehicle based on the statistical data related to at least one of fuel consumption and Exhaust emissions.

In another case, above mentioned acquired statistical data include statistical data related to diagnostic code of OBD-II(On Board Diagnostics II). Here, the acquired statistical data is classified according to at least one of driver, transportation business operator, model of vehicle, model year of vehicle, respectively. Therefore, the performing of the mining analysis may include: generating at least one of predicted information regarding abnormality of vehicle, accident risk, and vehicle maintenance based on the statistical data related to diagnostic code.

Data Mining Process at Long-Tem Viewpoint (S3390)

Figure 11:
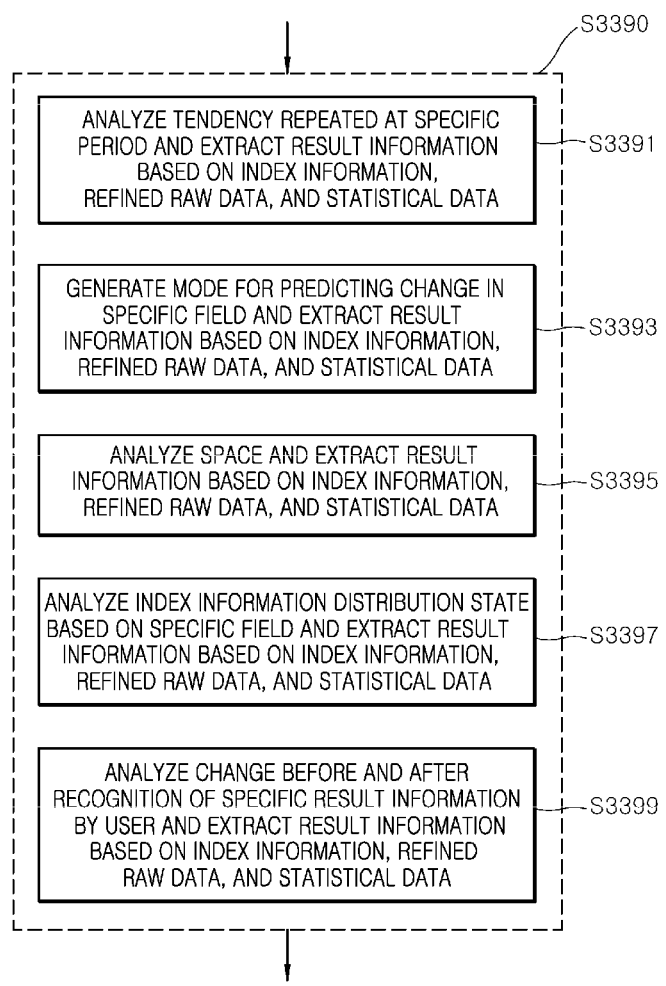

Referring to FIGS. 3 and 11, the processing unit 330 may perform a data mining analysis at a long-term viewpoint by using the refined vehicle driving data, the acquired statistical data, the generated index information, and the like to generate specific result information (S3390).

Here, the data mining at the long-term viewpoint is a time sequential concept including a data analysis concept at the long-term viewpoint and a data analysis concept at a macroscopic viewpoint for various VDRs 100.

In the embodiment, the processing unit 330 may analyze a repeated tendency at a specific period based on the refined vehicle driving data, the acquired statistical data, and the index information and extract result information representing the analysis result (S3391 of FIG. 11).

For example, the processing unit 330 may analyze repeated patterns for each day, for each time, for each season, or for each event (irregular event such as holidays, long weekends, and accidents) in the fields of the tendency statistical data of the acquired statistical data to extract result information representing driving tendencies and driving habits of the driver at a specific period. The result information may include information representing common driving tendencies and driving habits of all drivers as well as the driving tendency and the driving habit of the specific driver at the specific period.

Meanwhile, the processing unit 330 pre-stores the dangerous driving index information, the fuel consumption index information, and the like in the system 300 of processing and analyzing the vehicle driving big data or analyzes a correlation with other information such as weather information and traffic information provided from an external device to extract result information indicating the interaction analysis result therebetween.

In another embodiment, the processing unit 330 may generate a learning model for predicting a change of a specific field based on the refined vehicle driving data, the acquired statistical data, and the index information, and extract result information representing a prediction result for the change of the specific field (S3393 of FIG. 11).

As one example, the processing unit 330 may create a learning model for predicting an accident occurrence time and the like based on the accident history field and extract result information representing the predicted accident occurrence time, the risk, and the like together with the accident risk index information.

As another example, the processing unit 330 may create a learning model for predicting a failure occurrence time and the like based on the maintenance history field and extract result information indicating the predicted maintenance time, the failure risk, and the like together with the maintenance object index information.

Meanwhile, the processing unit 330 extracts common features from the result information indicating the accident occurrence time and the risk or the failure occurrence time and the risk for each of various VDRs, for example, a common accident occurrence time and a common failure occurrence time of a specific vehicle type (or a specific vehicle model) to generate result information indicating the accident risk and the failure risk for a specific vehicle type.

In another embodiment, the processing unit 330 may analyze a spatial data related feature based on the refined vehicle driving data, the acquired statistical data, and the index information and extract result information representing the analysis result (S3395).

For example, the processing unit 330 may extract result information indicating a high-risk road, a regular sudden stop road, an excessive carbon dioxide emissions caused road, and the like, based on the GPS location field for the various VDRs and the dangerous driving index information, the fuel consumption index information, the environment index information, and the like for the various VDRs.

Meanwhile, the processing unit 330 may match the GPS location field, the dangerous driving index information, the fuel consumption index information, the environment index information, and the like with electronic map data pre-stored in the system 300 (see FIG. 1) of processing and analyzing the vehicle driving big data or provided from an external device to extract result information indicating an index distribution related with the tendencies of the drivers for each administrative district.

In yet another embodiment, the processing unit 330 may extract result information indicating a distribution state of the index information based on the specific field, based on the refined vehicle driving data, the acquired statistical data, and the index information (S3397).

For example, the processing unit 330 may analyze a distribution state of the dangerous driving index, the fuel consumption index information, the environment index information, and the like of the drivers based on a transportation operation registration number field to extract result information indicating a driver type for each company and an index information distribution state for each company.

In yet another embodiment, the processing unit 330 may extract result information indicating a change before and after a user recognizes the result information, based on the refined vehicle driving data, the acquired statistical data, and the index information (S3399).

For example, the processing unit 330 may receive, from the driver, the transportation business operator, and the like, analysis information generated by complexly analyzing the dangerous driving index information, the fuel consumption index information, the environment index information, and the result information by the controller 350, and information on a date at which an alarm message and the like are provided to the corresponding driver or a date at which an education provided to the transportation business operator to which the driver belongs to target the corresponding driver is performed. As a result, the processing unit 330 may analyze a change in driving tendency of the driver by checking a change in the vehicle driving data, the acquired statistical data, and the index information for before and after the driver recognizes the specific result information or before and after education of the driver and extract result information indicating the analysis result.

As such, analysis performance of the system 300 of processing and analyzing the vehicle driving big data may be improved through complex and efficient data mining.

Figure 12:
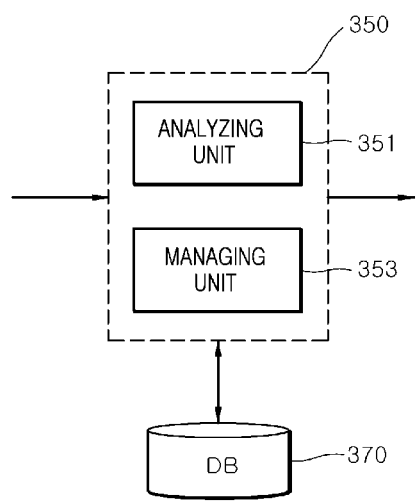
FIG. 12 is a diagram for more particularly describing a controller in the system of processing and analyzing the vehicle driving big data according to the embodiment of the present invention.

[Function and Role of Controller—FIG. 12]

FIG. 12 is a diagram for more particularly describing the controller 350 in the system 300 of processing and analyzing the vehicle driving big data. Referring to FIG. 12, the controller 350 may include an analyzing unit 351 and a managing unit 353.

The analyzing unit 351 complexly analyzes the index information, the result information, and the plurality of statistical data generated in the processing unit 330 to generate various analysis information and alarm messages reflecting the analysis result.

For example, the analyzing unit 351 may generate index analysis information, statistical analysis information for each time and for each company, and the like for at least one of the analysis information on a driving tendency of an individual vehicle driver, fuel consumption index, and environmental performance index. The analyzing unit 351 may generate an alarm message for providing accident risk index information and the like to the driver and the transportation business operator.

Further, the analyzing unit 351 may generate analysis information and an alarm message which reflect results analyzing the driving tendency of the drivers for each administrative district, the accident risk of a specific road, an environmental effect, and the like.

The managing unit 353 may store and manage the analysis information, the alarm message, the statistical data provided from the processing unit 330, the index information, and the result information in the database 370.

The managing unit 353 may provide the analysis information and the like to the driver, sales business and/or rental operator for vehicle, the transportation safety authority, and the like through the user interface 390, according to a predetermined period or when the driver, the transportation business operator, the transportation safety authority, and the like request.

Accordingly, safe driving induction of the vehicle driver, vehicle fuel efficiency improvement induction, pre-maintenance induction, and accident prevention are possible, management efficiency of the transportation business operator may be improved, and an administrative district, a road, and the like causing accident risk and environmental degradation in public institutions such as the transportation safety authority may be efficiently improved.

[Function and Role of User Interface Unit—FIGS. 13, and 14 to 19]

Figure 13:
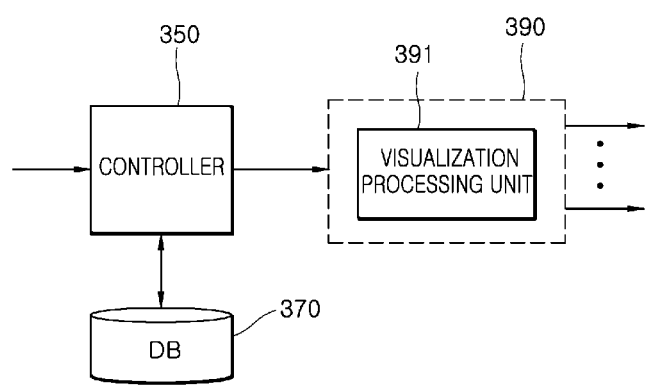
FIG. 13 is a diagram for more particularly describing a user interface in the system of processing and analyzing the vehicle driving big data according to the embodiment of the present invention.

FIG. 13 is a diagram for more particularly describing the user interface unit 390, and FIGS. 14 to 19 are diagrams illustrating implementable examples of visualization provided from the user interface unit 390.

Referring to FIG. 13, the user interface unit 390 may include a visualization processing unit 391.

The visualization processing unit 391 visualizes statistical data, result information, and the like provided from the controller 350 to be directly recognized by a user such as a driver and a transportation business operator. For example, the visualization processing unit 391 may perform visualization for cluster analysis for each single vehicle driving field included in the vehicle driving data, visualization for statistical analysis for each single vehicle driving field, visualization for scale reclassification for each single vehicle driving field, visualization for cross analysis between two vehicle driving fields having a correlation among the vehicle driving data, visualization for time sequential raw data analysis for the vehicle driving data, and the like.

Further, the visualization processing unit 391 may also perform visualization processing related with various mining analysis such as the data mining process at the short-term viewpoint (S3370) and the data mining process at the long-term viewpoint (S3390) described above, that is, visualization processing for deducting the result information by performing the mining analysis. As such, through the visualization processing of the visualization processing unit 391, the user may directly perform the various mining analysis such as the data mining process at the short-term viewpoint (S3370) and the data mining process at the long-term viewpoint (S3390).

Figure 14:
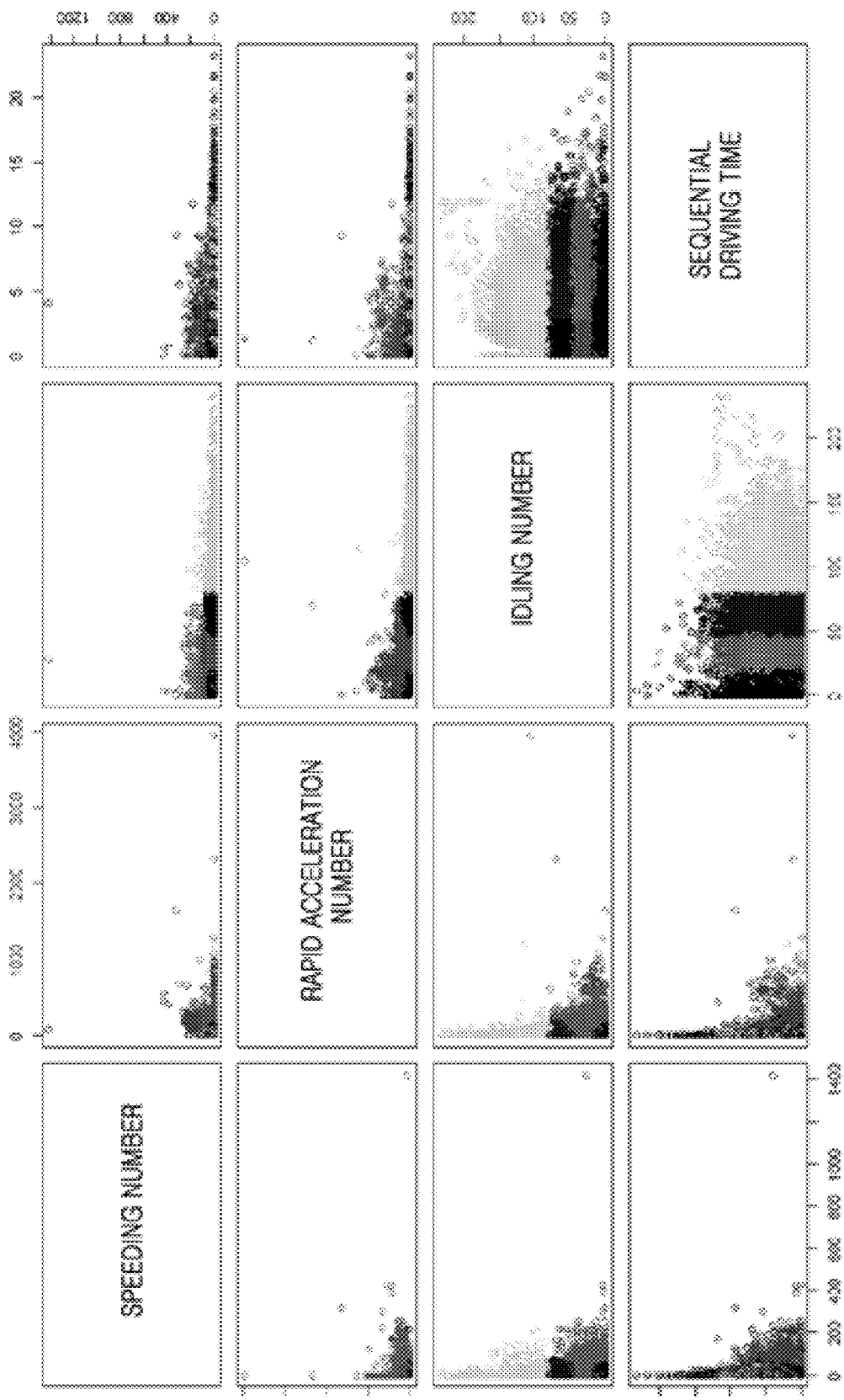
FIGS. 14 to 19 are diagram for describing implementable examples of data visualization provided by the user interface.
Figure 15:
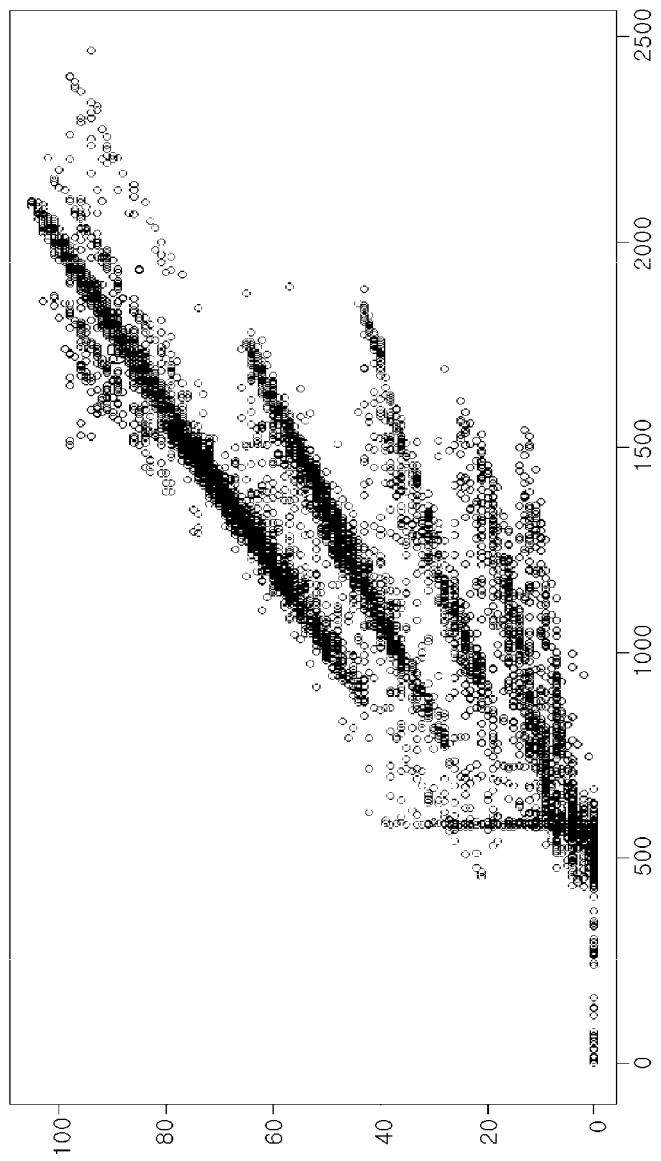

When examples of the visualization will be described in more detail with reference to FIGS. 14 to 19, the visualization processing unit 391 may visualize records of fields of the number of overspeed, the number of rapid acceleration, and the like of the vehicles in the statistical data to perform the cluster analysis as illustrated in FIG. 14. Further, the visualization processing unit 391 may visualize records of fields of a vehicle speed, an RPM, and the like in the vehicle driving data to perform cross analysis, as illustrated in FIG. 15.

Figure 16:
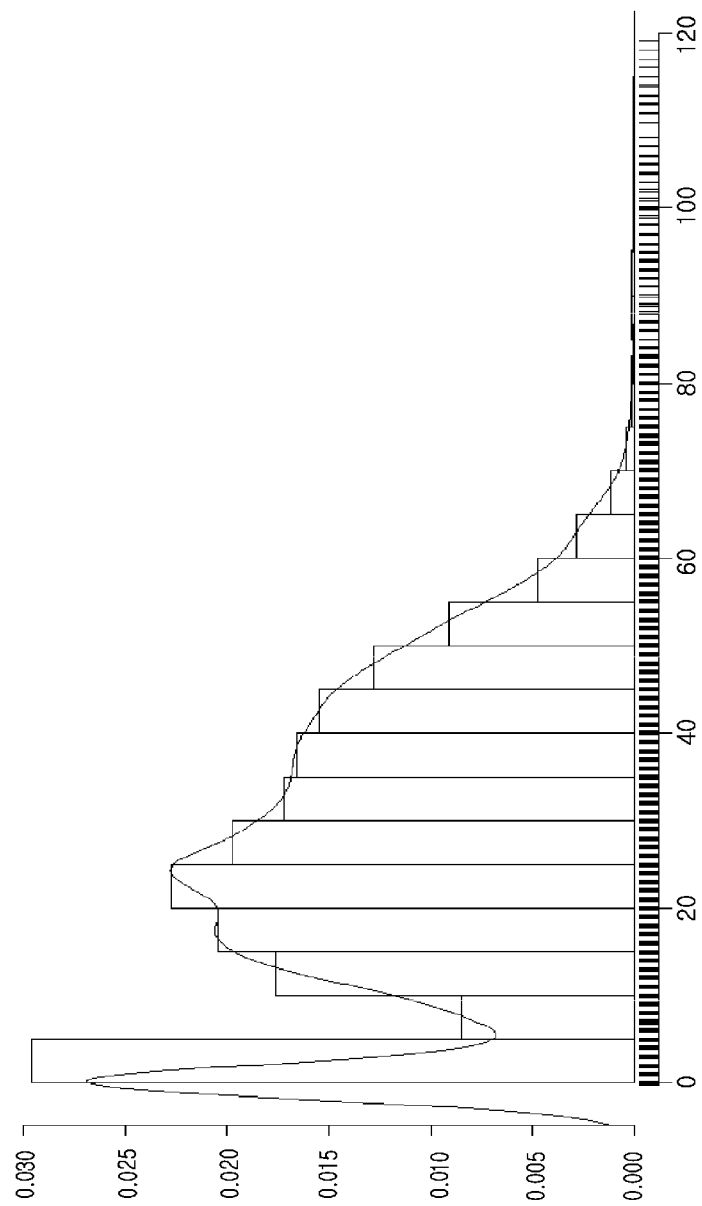
Figure 17:
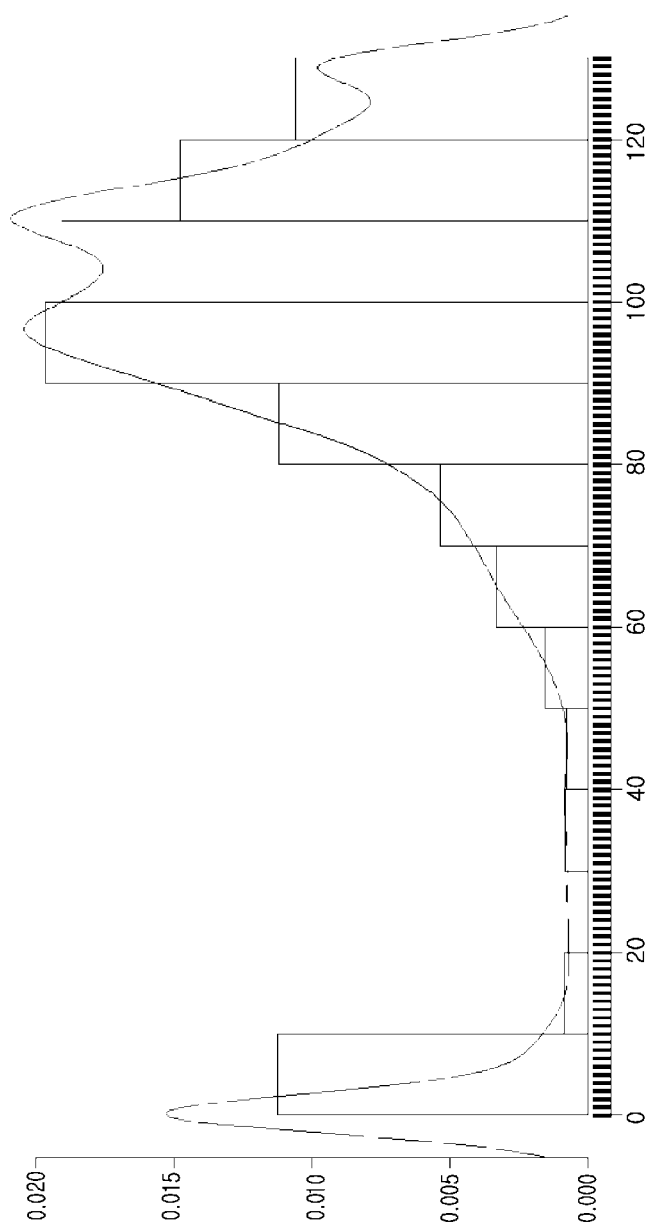
Figure 18:
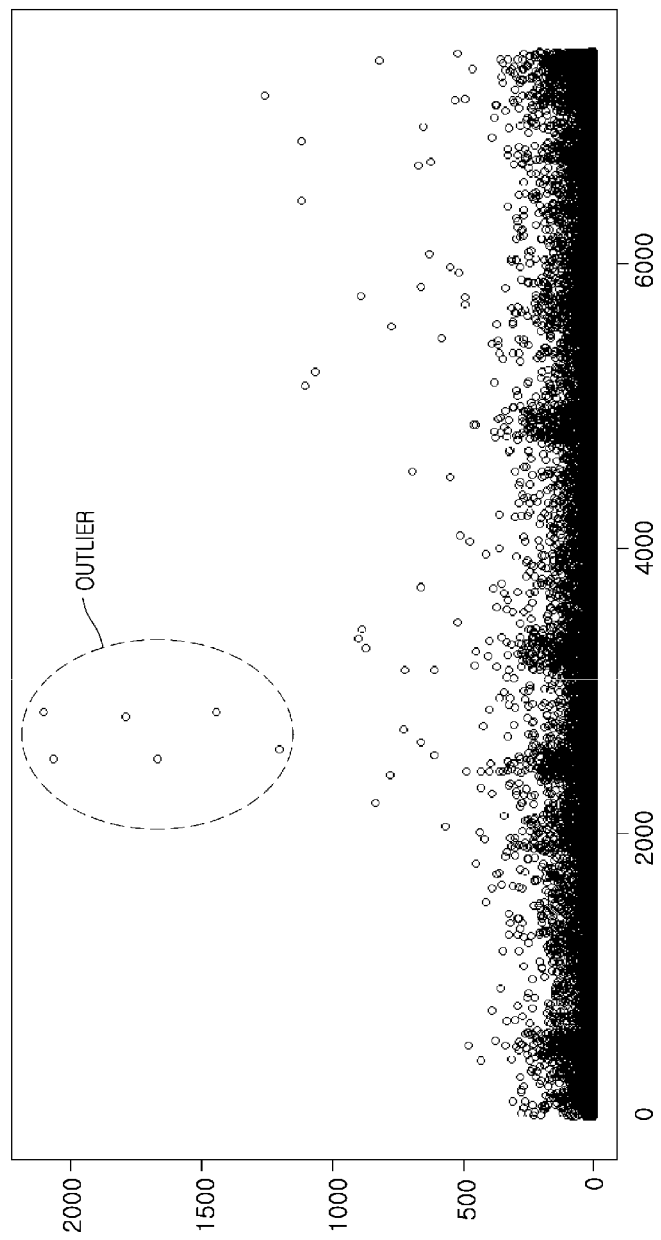
Figure 19:
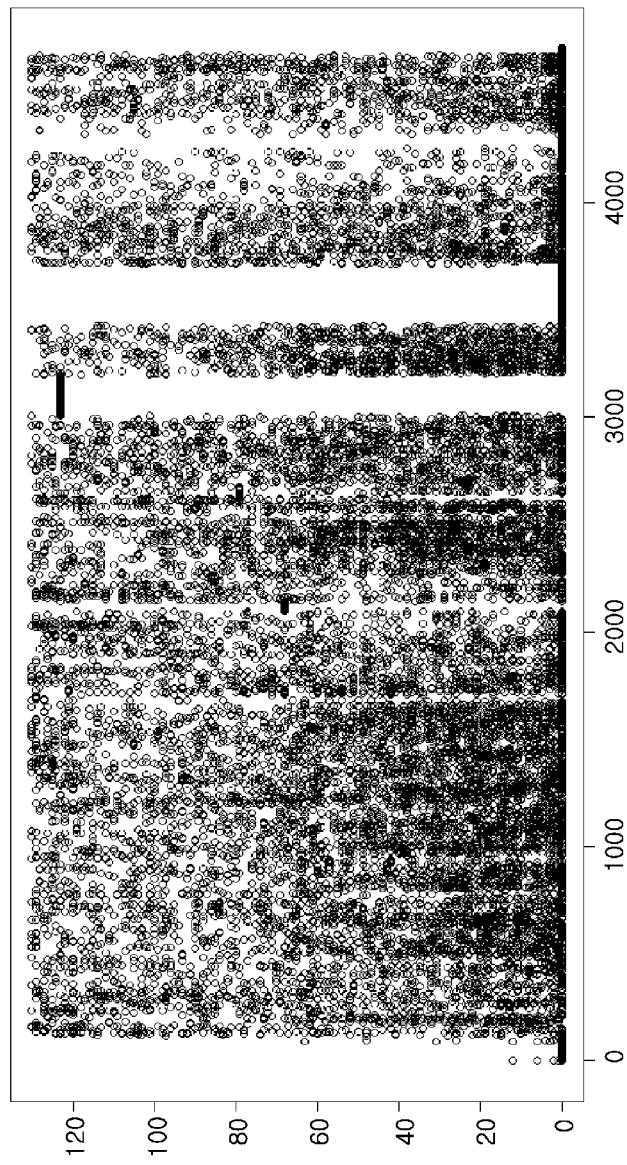

The visualization processing unit 391 may express average speed and maximum speed fields of the statistical data as histograms as illustrated in FIGS. 16 and 17, may visualize an outlier of the overspeed number of the vehicles in the statistical data in a form such as dispersion to be easily checked as illustrated in FIG. 18, and further, may visualize an outlier of records of the time sequential vehicle speed field in the vehicle driving data to be easily checked as illustrated in FIG. 19.

As such, the system 300 of processing and analyzing the vehicle driving big data provides the extracted information to the user through visualization processing by the user interface unit 390 so that the user may intuitionally recognize and efficiently use the extracted information from the big data and may directly perform the mining analysis.

Hereinabove, the present invention has been described in detail with reference to the preferred embodiment, but the present invention is not limited to the embodiment and various modifications and changes may be made by those skilled in the art within the technical spirit and scope of the present invention.

What is claimed is:

1. A method of processing vehicle driving data by a big data processing apparatus, the method comprising:
   detecting a first outlier in each field of sensing data included in the vehicle driving data, the first outlier representing field values out of a predetermined range;
   generating first refined data by correcting or removing the first outlier from the sensing data;
   detecting a second outlier in the first refined data, the second outlier representing field values having a deviation greater than a predetermined threshold between consecutive field values of a same field or between different fields correlated to each other; and generating second refined data by removing the second outlier from the first refined data;
generating statistical data based on the second refined data; and
performing mining analysis based on at least one of the second refined data and the statistical data.

2. The method of claim 1, wherein the vehicle driving data further includes identification data,
wherein the identification data indicates at least one of a vehicle identification number, a vehicle type, a vehicle registration number, a transportation business operator registration number, and a driver identification code, shipping document information, name of shipper and commodity, and
wherein the each field of the sensing data indicates at least one of a travel distance, a driving time, starting time, a data acquisition period, a data acquisition time, a speed, an Revolution Per Minute (RPM), a break signal, a position, an azimuth, and acceleration, location of the vehicle, On Board Diagnostics II (OBD-II) information.

3. The method of claim 1, wherein the generating first refined data comprises changing the field values of the first outlier to new field values within the predetermined range.

4. The method of claim 1, wherein the statistical data includes driving statistical data and tendency statistical data,
wherein the driving statistical data indicates at least one of a daily travel distance, a total driving time, an average speed, a maximum speed, and a maximum RPM, mileage, fuel consumption, energy consumption, Exhaust emissions, driving area, distance between cars, and
wherein the tendency statistical data indicates at least one of a number of overspeed, a number of dangerous overspeed, a number of long-term overspeed, a number of sudden acceleration, a number of sudden deceleration, a number of sudden start, a number of sudden stop, a number of overtaking, a number of sudden course changing, a number of sudden turn, a number of idling, and a number of high RPM.

5. The method of claim 1, further comprising:
detecting a field value for each field of the second refined data that is repetitively counted within a predetermined time in generating the statistical data; and
correcting the statistical data to count the detected field value once during the predetermined time.

6. The method of claim 1, wherein the performing of the mining analysis includes:
classifying drivers to a plurality of driving tendencies based on the statistical data; and
indexing the drivers with a degree of a corresponding driving tendency.

7. The method of claim 6, wherein the performing of the mining analysis further includes:
generating index information indicating a result of the indexing; and
analyzing a correlation between at least one of fields of the statistical data and the index information.

8. The method of claim 6, wherein the performing of the mining analysis further includes:
generating index information showing distribution of a result of the indexing with respect to transportation business operators, based on a transportation business operator registration number field of the second refined data.

9. The method of claim 6, wherein the performing of the mining analysis further includes:
generating index information showing a result of the indexing;
detecting a change of the index information, the second refined vehicle driving data, and the statistical data after a driver recognizes the index information; and
analyzing a change of a driving tendency of the driver based on a result of the detecting.

10. The method of claim 1, wherein the performing of the mining analysis includes:
detecting a repeated pattern occurring during a specific time period in the second refined data and the statistical data; and
analyzing a driving type of drivers during the specific time period based on the pattern.

11. The method of claim 1, wherein the statistical data includes history data indicating an accident history field and a maintenance history field, and
the performing of the mining analysis includes:
generating a learning model for predicting a change in at least one of the accident history field and the maintenance history field, based on the second refined data and the statistical data; and
analyzing at least one of accident potential and a maintenance schedule by using the learning model.

12. The method of claim 11, wherein the performing of the mining analysis further includes generating index information indicating a degree of the accident potential and how much time is left before next maintenance according to the maintenance schedule, based on a result of the analyzing.

13. The method of claim 1, wherein the performing of the mining analysis includes:
extracting location information of vehicles based on the second refined data and the statistical data; and
determining a location having high accident potential or high air pollution potential based on the extracted location information and driving tendencies that are determined based on the statistical data.

14. The method of claim 1, wherein the performing of the mining analysis includes:
extracting location information of vehicles based on the second refined data and the statistical data; and
analyzing driving tendencies of drivers for each administrative district, based on the extracted location information, the statistical data, and map data.

15. The method of claim 1, further comprising:
collecting the vehicle driving data from vehicle driving recorders or sensors of a plurality of vehicles.

16. The method of claim 1, wherein the statistical data includes statistics showing at least one of fuel consumption and exhaust emissions with respect to at least one of drivers, transportation business operators, regions, and roads, and
the performing of the mining analysis includes generating at least one of eco driving information and overloading information based on the statistics.

17. The method of claim 1, wherein the statistical data includes statistics showing diagnostic code of On Board Diagnostics II (OBD-II) with respect to at least one of drivers, transportation business operators, vehicle models, vehicle years, and
the performing of the mining analysis includes generating at least one of prediction information regarding abnormality of vehicle, accident potential, and vehicle maintenance schedule based on the statistics.

18. A system for processing vehicle driving data, the system comprising:
a storing unit configured to store the vehicle driving data; and a processing unit configured to:
- detect a first outlier in each field of sensing data included in the vehicle driving data, the first outlier representing field values out of a predetermined range;
- generate first refined data by correcting or removing the first outlier from the sensing data;
- detect a second outlier in the first refined data, the second outlier representing field values having a deviation greater than a predetermined threshold between consecutive field values of a same field or between different fields correlated to each other; and
- generate second refined data by removing the second outlier from the first refined data;
- generate statistical data based on the second refined data, and
- perform mining analysis based on at least one of the second refined data and the statistical data.

* * * * *